United States Patent [19]

McGee

[11] 4,234,908
[45] Nov. 18, 1980

[54] STORABLE LIGHT ASSEMBLY FOR VEHICLES

[75] Inventor: Mary Ann C. McGee, Peoria, Ill.

[73] Assignee: Caterpillar Tractor Co., Peoria, Ill.

[21] Appl. No.: 923,123

[22] Filed: Jul. 10, 1978

[51] Int. Cl.³ .............................................. B60Q 1/06
[52] U.S. Cl. ..................................... 362/66; 362/154; 362/287; 362/427
[58] Field of Search ..................... 362/61, 65, 66, 127, 362/154, 287, 427

[56] References Cited

U.S. PATENT DOCUMENTS

| | | | |
|---|---|---|---|
| 1,648,492 | 11/1927 | Mc Connell | 362/154 |
| 2,124,346 | 7/1938 | Grimes | 362/66 |
| 2,673,282 | 3/1954 | D'Incerti | 362/427 X |
| 2,749,431 | 6/1956 | Dover | 362/371 X |
| 2,772,406 | 11/1956 | Juergens | 362/66 X |
| 3,731,079 | 5/1973 | Porsche | 362/65 |
| 3,887,093 | 6/1975 | Howell | 362/61 X |
| 3,934,134 | 1/1976 | Wassel | 362/66 |
| 4,023,030 | 5/1977 | Teti | 362/61 |
| 4,071,742 | 1/1978 | Pantanella | 362/127 |
| 4,091,442 | 5/1978 | Markey | 362/427 X |

FOREIGN PATENT DOCUMENTS 837610  6/1960  United Kingdom ..................... 362/65

*Primary Examiner*—Peter A. Nelson
*Attorney, Agent, or Firm*—Phillips, Moore, Weissenberger, Lempio & Majestic

[57] ABSTRACT

A pair of light assemblies (13) are mounted on either side of a vehicle (10). Each light assembly comprises a road light (14) normally maintained in a stored and protected position within a receptacle (17) defined on a side of the vehicle and adapted to be moved laterally outwardly to an extended position during roading of the vehicle. A cover (19) is pivotally mounted on the vehicle to cover and protect the road light when it is maintained in its stored position within the receptacle, during operation of the vehicle in a work environment.

11 Claims, 2 Drawing Figures

STORABLE LIGHT ASSEMBLY FOR VEHICLES

TECHNICAL FIELD

This invention relates to a storable light assembly mounted on a side of a construction or other suitable vehicle for movement between a stored and protected position during operation of a vehicle in a work environment and an extended position on a side of the vehicle during roading thereof with the light assembly being operational in both positions.

BACKGROUND ART

Conventional construction vehicles, such as wheel loaders, are normally driven between job sites on public roadways and the like. Such a vehicle is required to have road lights mounted thereon outwardly of the vehicle's tires when it is driven between job sites to define an overall width of the vehicle. During operation of the vehicle in a work environment, such laterally extended road lights become subjected to damage by flying debris and the like and could affect the turning radius and clearance of the vehicle to hinder operation thereof.

Therefore, it has proven desirable to provide protection for the road lights during such operation of the vehicle. One solution to this problem has been the provision of shrouds for the road lights to substantially protect them against damage. However, the lamps of the road lights normally remain exposed to potential damage.

Another solution to the problem has been the provision of mounting brackets for the road light which permit pivoting of the road lights to a somewhat protected upright position on the vehicle during operation thereof. Upon roading of the vehicle, the brackets are released and pivoted downwardly and outwardly alongside the vehicle. The latter bracket arrangement is somewhat complex and does not always provide the road lights with the necessary protection and are not operational in their stored positions.

DISCLOSURE OF THE INVENTION

The present invention is directed to overcoming one or more of the problems as set forth above.

In one aspect of this invention, means are provided for movably mounting a road light on a side of a vehicle for moving the road light between (1) a stored and protected position in a receptacle defined on the vehicle, and (2) an extended position on a lateral side of the vehicle during roading thereof with the light preferably being operational in both positions.

A window is defined in the receptacle to expose the light when the light is in its stored position.

In another aspect of this invention, the light is carried by an arm to pivot the light through an arc approximately 270° and a cover means normally covers the light when it is in its stored position.

The invention thus solves the problem of having to fully expose the road light during roading of the vehicle while still permitting full protection of the road light during vehicle operation.

BRIEF DESCRIPTION OF THE DRAWING

Other objects of this invention will become apparent from the following description and accompanying drawing wherein.

BEST MODE FOR CARRYING OUT THE INVENTION

Figure 1:
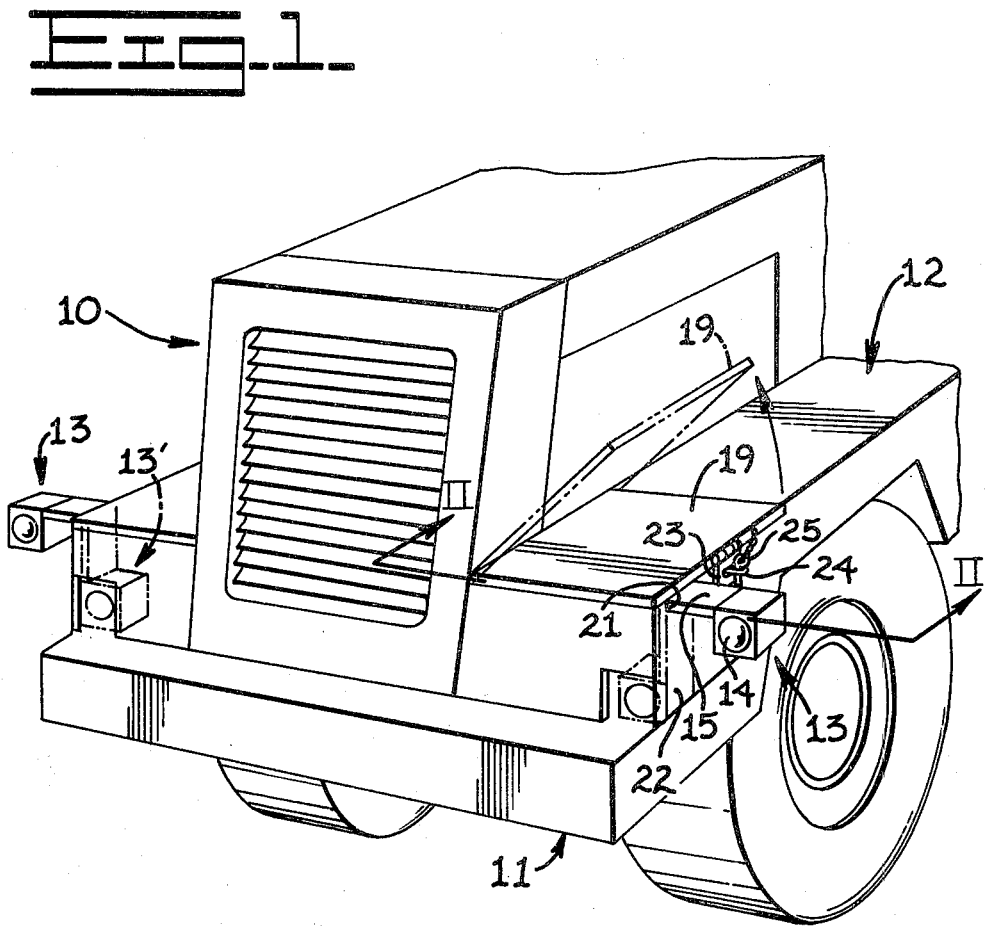
FIG. 1 is a partial isometric view of a rearward end of a construction vehicle having an embodiment of the present invention, comprising a pair of storable road light assemblies, mounted on sides thereof.

FIG. 1 partially illustrates a construction vehicle 10, such as a wheel loader. The wheel loader comprises a bumper assembly 11 and a pair of laterally spaced fender assemblies 12 suitably secured rearwardly on the vehicle. This invention is directed to a protectable and storable road light assembly mounted on each fender assembly for movement between its solid line extended, operating position 13 during roading of the vehicle and its phantom lined stored, operating position 13' within the fender assembly during operation of the vehicle in a work environment.

Although the road light assembly is shown mounted rearwardly on the vehicle to provide a tail light therefor, it should be understood that the assembly could likewise be mounted forwardly on the vehicle to provide a headlight therefor. Each road light assembly comprises a road light 14 secured on the end of an arm 15 of a mounting means which is pivotally mounted on the fender assembly by a hinge 16. The road light, suitably connected to the electrical circuit of the vehicle, is thus adapted for pivotal movements between its stored position within a receptacle 17 defined in a fender assembly and its extended position on a side of the vehicle. It should be noted that other vehicle components, such as a battery 18, may be mounted in the receptacle, if so desired.

A cover 19, preferably in the form of a flat plate, is preferably pivotally mounted on the fender assembly by a hinge 20 for normally covering the road light when it is maintained in its stored position within the receptacle and also permits the road light to be moved to its extended position upon opening thereof. It should be noted that a slot 21 is formed through an upper end of an outer panel 22 of the fender assembly, having arm 15 pivotally mounted thereon, to receive the arm therein when the arm is maintained in its extended position, laterally of the vehicle. A free end of cover 19 overlies an inner portion of the arm and also slot 21 to retain and lock the arm in such position. A latch, such as a hasp 23, a staple 24 and a pin 25, is preferably utilized to lock and releasably secure cover 19 in its closed position over receptacle 17.

The fender assembly also includes a rear panel 27 having a rear window or limited opening 27 formed therethrough. The window is suitably positioned to register or align with light 14 when it is disposed in its stored position 14' (FIG. 1). Accordingly, the light is visible through the window, but remains fully protected within receptacle 17.

INDUSTRIAL APPLICABILITY

Figure 2:
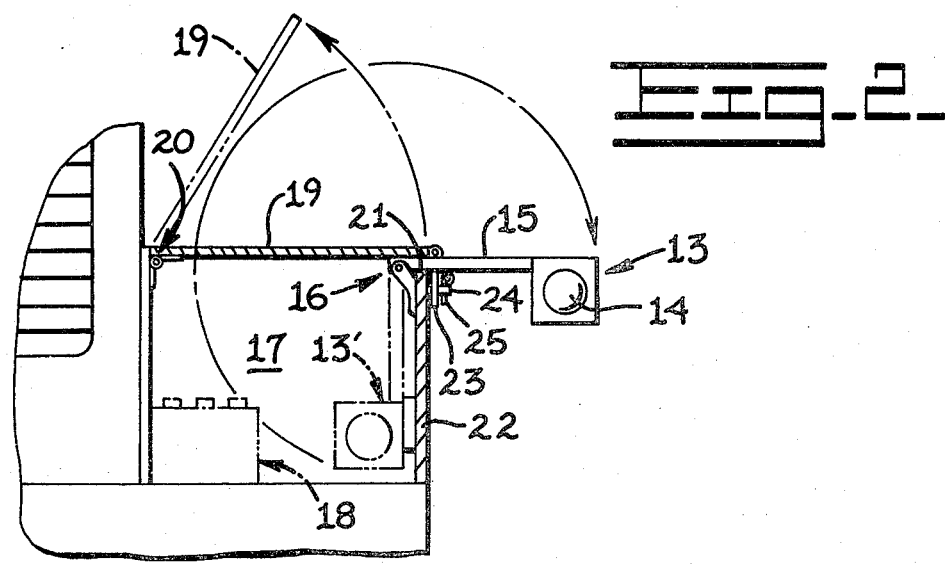
FIG. 2 is an enlarged cross-sectional view, generally taken in the direction of arrows II—II in FIG. 1, illustrating one of the road light assemblies.

When vehicle 10 is driven over a roadway from one job site to another, road lights 14 are disposed in their extended operating positions, laterally of the vehicle. As more clearly shown in FIG. 2, cover 19 may be opened sufficiently to provide clearance for each road light 14 and attached arm 15 upon outward, pivotal movement thereof. The cover is disposed over the arm and is locked to panel 22 by the above-described latch comprising hasp 23 and staple 24. The road lights are thus secured in an extended position laterally on either side of the vehicle to provide substantial visibility to other drivers.

Upon arrival of the vehicle at a job site, the operator need only unlatch cover 19 and pivot it to its illustrated phantom-lined open position 19' whereby arm 15 may be pivoted inwardly through an arc approximating 270°, towards the vehicle and into receptacle 17 to retain each road light assembly in its stored position 13'. The cover may then be lowered and latched to panel 22 by the above-described latch to fully enclose and protect the road light assembly against damage during operation of the vehicle. In such a stored position, the lights are still visible through their respective windows 27. As suggested above, receptacle 17 may serve the further function of retaining vehicle components, such as battery 18, therein.

Other aspects, objects and advantages of this invention can be obtained from a study of the drawing, the disclosure and the appended claims.

What is claimed is:

1. A vehicle (10) comprising
   means for defining a receptacle (17) on a side of said vehicle,
   means for defining a window (27) in said receptacle, said window exposed towards one of the forward and rearward ends of said vehicle, and
   a light assembly (13) mounted on the side of said vehicle comprising
   a light (14), and
   mounting means (15) for movably mounting said light on said vehicle for movement between a stored, operating position within said receptacle to align said light with said window and an extended, operating position remote from said stored operating position, and on a lateral side of said vehicle, said light pointing towards said one of the forward and rearward ends of said vehicle in each of its stored and extended positions.

2. The vehicle of claim 1 further comprising
   cover means (19) on said vehicle for normally covering said light when it is maintained in its stored, operating position within said receptacle and for permitting said light to be moved to its extended, operating position.

3. The vehicle of claim 2 wherein said mounting means includes the arm (15) pivotally mounted within said receptacle and wherein said light is secured on an end of said arm.

4. The vehicle of claim 3 wherein said arm is pivotal through an arc approximating 270°.

5. The vehicle of claim 3 further including a fender assembly (12) having said receptacle defined therein and wherein said arm is pivotally mounted on an upper end of an outer panel (22) of said fender assembly partially defining said receptacle.

6. The vehicle of claim 5 further including a slot (21) formed through an upper end of said panel to receive said arm therein when said arm is pivoted laterally outwardly of said vehicle to dispose said light in its extended, operating position and wherein said cover means overlies said slot and said arm when said arm is in such position.

7. The vehicle of claim 6 wherein said cover means has a plate (19) pivotally mounted on said fender assembly.

8. The vehicle of claim 5 or 6 further including latch means (23,24,25) for releasably securing said cover means to said panel.

9. The vehicle of claim 1 wherein said light assembly is mounted on each lateral side of said vehicle.

10. The vehicle of claim 5 wherein said receptacle is further defined by another panel defining said window therein.

11. A vehicle (10) comprising
    means for defining a receptacle (17) on a side of said vehicle,
    means for defining a window (27) in said receptacle, and
    a light assembly (13) mounted on the side of said vehicle comprising
    a light (14),
    mounting means (15) for movably mounting said light on said vehicle for movement between a stored, operating position within said receptacle to align said light with said window and an extended, operating position remote from said stored operating position, said mounting means including an arm (15) pivotally mounted within said receptacle for pivotal movement through an arc approximating 270°, and wherein said light is secured on an end of said arm, and
    cover means (19) on said vehicle for normally covering said light when it is maintained in its stored, operating position within said receptacle and for permitting said light to be moved to its extended, operating position.

* * * * *